(12) United States Patent
Blea et al.

(10) Patent No.: US 8,892,836 B2
(45) Date of Patent: Nov. 18, 2014

(54) AUTOMATED MIGRATION TO A NEW COPY SERVICES TARGET STORAGE SYSTEM TO MANAGE MULTIPLE RELATIONSHIPS SIMULTANEOUSLY WHILE MAINTAINING DISASTER RECOVERY CONSISTENCY

(71) Applicant: International Business Machines Corporation, Armonk, NY (US)

(72) Inventors: Amy N. Blea, Round Rock, TX (US);
David R. Blea, Tucson, AZ (US);
Gregory E. McBride, Vail, AZ (US);
John J. Wolfgang, Midlothian, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/068,290

(22) Filed: Oct. 31, 2013

(65) Prior Publication Data
US 2014/0059009 A1 Feb. 27, 2014

Related U.S. Application Data

(63) Continuation of application No. 13/592,210, filed on Aug. 22, 2012.

(51) Int. Cl.
*G06F 11/00* (2006.01)
*G06F 11/14* (2006.01)
*G06F 11/20* (2006.01)
*G06F 3/06* (2006.01)

(52) U.S. Cl.
CPC ........ *G06F 11/1471* (2013.01); *G06F 11/2074* (2013.01); *G06F 3/067* (2013.01); *G06F 11/2069* (2013.01)

USPC .......................................................... 711/162

(58) Field of Classification Search
None
See application file for complete search history.

(56) References Cited

U.S. PATENT DOCUMENTS

| 7,519,785 B1 | 4/2009 | Schultz et al. |
| 2007/0220223 A1* | 9/2007 | Boyd et al. ..................... 711/162 |
| 2014/0059307 A1 | 2/2014 | Blea et al. |

* cited by examiner

*Primary Examiner* — Matthew Bradley
*Assistant Examiner* — Craig Goldschmidt
(74) *Attorney, Agent, or Firm* — Zilka-Kotab, PC

(57) ABSTRACT

In one embodiment, a method for switching a storage subsystem in a disaster recovery configuration includes receiving instruction to change from an original target storage subsystem in a disaster recovery configuration including: a source storage subsystem including one or more source volumes from which data is copied in first copy services relationships, the one or more source volumes being accessible to an application, and the original target storage subsystem including one or more original target volumes to which data is copied in the first copy services relationships; selecting a new target storage subsystem to replace the original target storage subsystem, creating second copy services relationships between one or more new target volumes on the new target storage subsystem and the one or more source volumes on the source storage subsystem using multi-target functionality, and terminating the first copy services relationships after all the second copy services relationships are full duplex.

8 Claims, 6 Drawing Sheets

AUTOMATED MIGRATION TO A NEW COPY SERVICES TARGET STORAGE SYSTEM TO MANAGE MULTIPLE RELATIONSHIPS SIMULTANEOUSLY WHILE MAINTAINING DISASTER RECOVERY CONSISTENCY

RELATED APPLICATIONS

This application is a continuation of copending U.S. patent application Ser. No. 13/592,210, filed Aug. 22, 2012, which is herein incorporated by reference.

BACKGROUND

The present invention relates to data storage, and more particularly, to automatically migrating data from one target storage system to a new target storage system while maintaining disaster recovery consistency.

Using conventional data storage systems, in the context of a data replication relationship, there is no automated way to migrate data from multiple target volumes, simultaneously, to other volumes while maintaining disaster recovery capability. There are instances during normal operation when the migration of a disaster recovery configuration to higher performing storage subsystems for improved performance or to upgrade an environment with new hardware would be beneficial. A completely automated migration to address these situations does not currently exist.

Instead, currently, the process involves manual steps which are time consuming, error prone, and could potentially result in some data loss. This can be even more difficult when using a copy services solution that provides managed consistency across multiple copy relationship pairings because, generally, the need to switch volumes will only affect a few of the pairings within that consistency group/session.

In order to perform the migration manually, the user would first have to remove the copy pairings for the relationships from the session and terminate the relationships on the hardware. Then, the user would have to re-establish a new relationship between the original source volumes and the new target volumes and wait for all of the data to be copied over. In order to maintain the integrity of the consistency group/session, this would have to be done outside of the consistency group/session and then added back in once the volumes reach full duplex. Of course, during this prolonged process there is no data consistency across the entire consistency group/session.

Therefore, a storage solution which automates the migration of data from one target storage system to a new target storage system while maintaining disaster recovery consistency would be beneficial.

SUMMARY

In one embodiment, a method for switching a storage subsystem in a disaster recovery configuration includes receiving instruction to change from an original target storage subsystem in a disaster recovery configuration, the disaster recovery configuration including: a source storage subsystem including one or more source volumes from which data is copied in first copy services relationships, the one or more source volumes being accessible to an application, and the original target storage subsystem including one or more original target volumes to which data is copied in the first copy services relationships; selecting a new target storage subsystem to replace the original target storage subsystem, creating second copy services relationships between one or more new target volumes on the new target storage subsystem and the one or more source volumes on the source storage subsystem using multi-target functionality, and terminating the first copy services relationships after all of the second copy services relationships are full duplex.

Other aspects and embodiments of the present invention will become apparent from the following detailed description, which, when taken in conjunction with the drawings, illustrate by way of example the principles of the invention.

DETAILED DESCRIPTION

Figure 1:
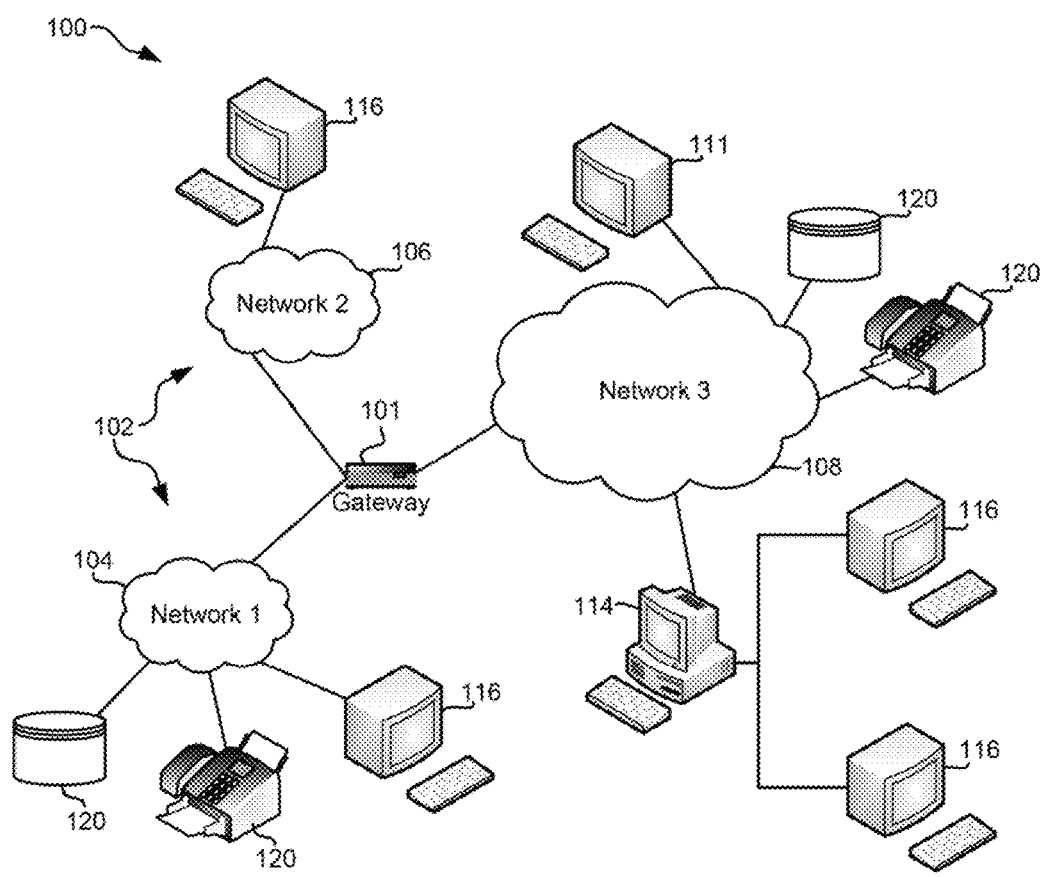
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, the migration of a disaster recovery configuration may be migrated without impacting the disaster recovery capability between the original volumes. To accomplish this, multi-target functionality may be used to automate the migration of data onto a new target storage subsystem without any manual intervention, such as creating and/or removing any new or existing copy relationships. One advantage of using this approach is that it saves significant amounts of time while reducing the large margin for error in removing and creating thousands of pairs manually, as is currently done conventionally. Another advantage of this approach is that, in some embodiments, it can be done without the need for losing disaster recovery capabilities or the need to wait for a full copy of the data to occur to the new target volume In one general embodiment, a method for switching a storage subsystem in a disaster recovery configuration includes receiving instruction to change from an original target storage subsystem in a disaster recovery configuration, the disaster recovery configuration including: a source storage subsystem including one or more source volumes from which data is copied in first copy services relationships, the one or more source volumes being accessible to an application, and the original target storage subsystem including one or more original target volumes to which data is copied in the first copy services relationships; selecting a new target storage subsystem to replace the original target storage subsystem, creating second copy services relationships between one or more new target volumes on the new target storage subsystem and the one or more source volumes on the source storage subsystem using multi-target functionality, and terminating the first copy services relationships after all of the second copy services relationships are full duplex.

In another general embodiment, a system includes one or more source volumes on a source storage subsystem from which data is copied in first copy services relationships, the one or more source volumes being accessible to an application, one or more original target volumes on an original target storage subsystem to which data is copied in the first copy services relationships, logic adapted for selecting a new target storage subsystem to replace the original target storage subsystem, logic adapted for creating second copy services relationships between one or more new target volumes on the new target storage subsystem and the one or more source volumes on the source storage subsystem using multi-target functionality, and logic adapted for terminating the first copy services relationships after all of the second copy services relationships are full duplex.

In yet another general embodiment, a computer program product for switching a storage subsystem in a disaster recovery configuration includes a computer readable storage medium having computer readable program code embodied therewith, the computer readable program code including computer readable program code configured for receiving an instruction to change from an original target storage subsystem in a disaster recovery configuration, the disaster recovery configuration including: a source storage subsystem including one or more source volumes from which data is copied in first copy services relationships, the one or more source volumes being accessible to an application, and the original target storage subsystem including one or more original target volumes to which data is copied in the first copy services relationships; computer readable program code configured for selecting a new target storage subsystem to replace the original target storage subsystem, computer readable program code configured for creating second copy services relationships between one or more new target volumes on the new target storage subsystem and the one or more source volumes on the source storage subsystem using multi-target functionality, and computer readable program code configured for terminating the first copy services relationships after all of the second copy services relationships are full duplex.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." in cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
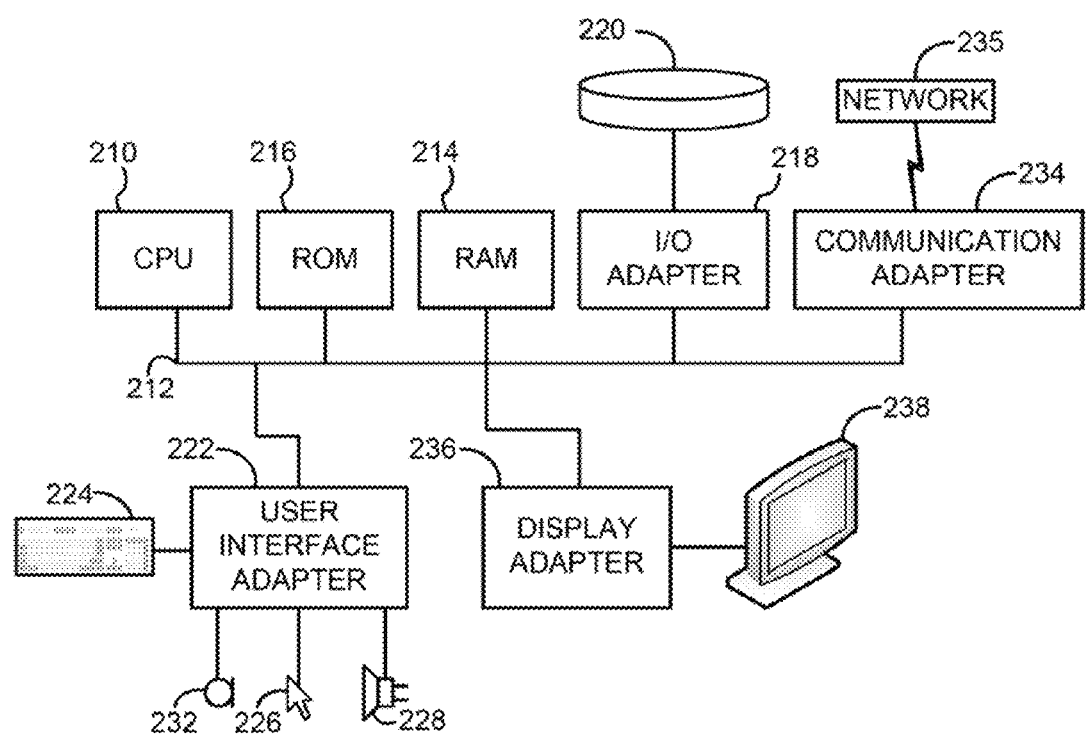
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments. Other types of processors may also be used, such as an integrated circuit (IC), an application specific integrated circuit (ASIC), a field programmable gate array (FPGA), or any other type of processor known in the art.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

According to various embodiments, any copy services management tool may be used in conjunction with the migration methods described herein. In one exemplary embodiment, IBM's Tivoli Storage Productivity Center for Replication may be used.

Figure 3:
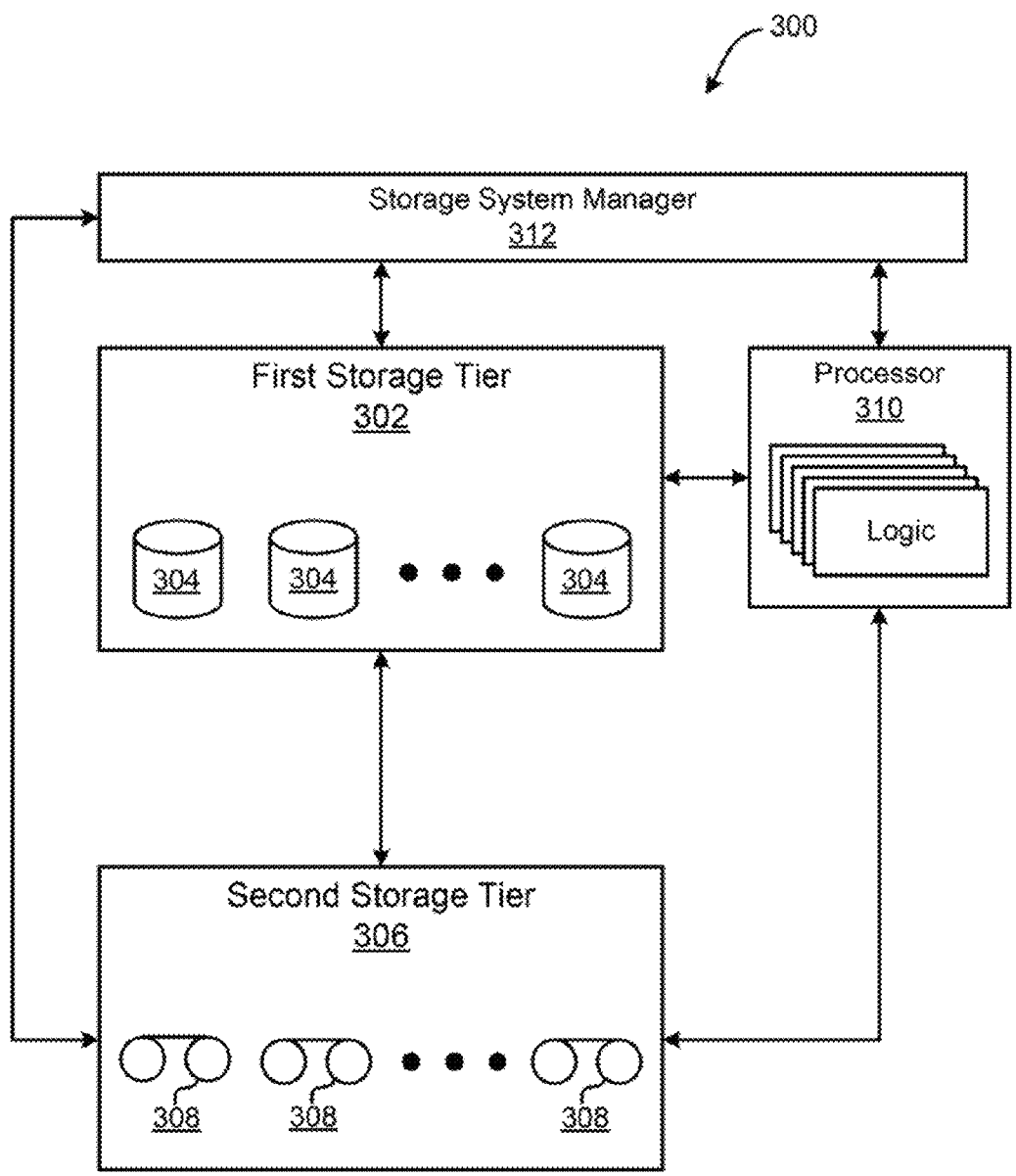
FIG. 3 is a simplified schematic of a storage system, according to one embodiment.

Referring to FIG. 3, a storage system 300 is shown, according to one embodiment. The storage system includes a first storage tier 302 and a second storage tier 306. The first storage tier 302 includes random access storage media 304, and the second storage tier 306 includes sequential access storage media 308. The storage system 300 also includes a processor 310 for executing logic therein, and a storage system manager 312. The processor 310 may be of any type known in the art, such as a central processing unit (CPU), a field programmable gate array (FPGA), an application specific integrated circuit (ASIC), etc. The logic which is described below may be implemented in hardware or software, or a combination of hardware and software, as would be known to one of skill in the art.

According to some embodiments, the storage system 300 includes logic for storing files in at least one directory in the first storage tier 302, logic for creating an index file which includes entries for each file stored in the at least one directory in the first storage tier 302, logic for aggregating in blocks the files stored in the at least one directory in the first storage tier 302, logic for opening a session with the storage system manager 312, logic for writing out the blocks of aggregated files stored in the at least one directory in the first storage tier 302 to the second storage tier 306, logic for writing metadata and storage location information for each aggregated block written to the second storage tier 306 to the index file, logic for closing the index file, and logic for closing the session with the storage system manager 312.

In one preferred embodiment, the storage system 300 may include logic for copying the index file to the second storage tier 306. This allows for a location of the blocks of files to be determined without accessing another system or storage media other than the second storage tier 306 where the aggregated blocks of files are now stored.

In one embodiment, the random access storage media 304 may include magnetic disk media. In another embodiment, the sequential access storage media 308 may include magnetic tape media.

In one approach, the index file may be a markup language index file, such as an XML index file, an HTML index file, etc.

In one embodiment, the problems encountered using conventional migration techniques may be eliminated or vastly alleviated by automating the process of switching to a different target storage subsystem without major interruption of disaster recovery capability or the interruption of host I/O access to the source volumes during the automated migration.

A system 400 utilizing a disaster recovery configuration between source and target storage subsystems is shown in FIGS. 4A-4D during various stages of a migration, according to one embodiment.

Figure 4A:
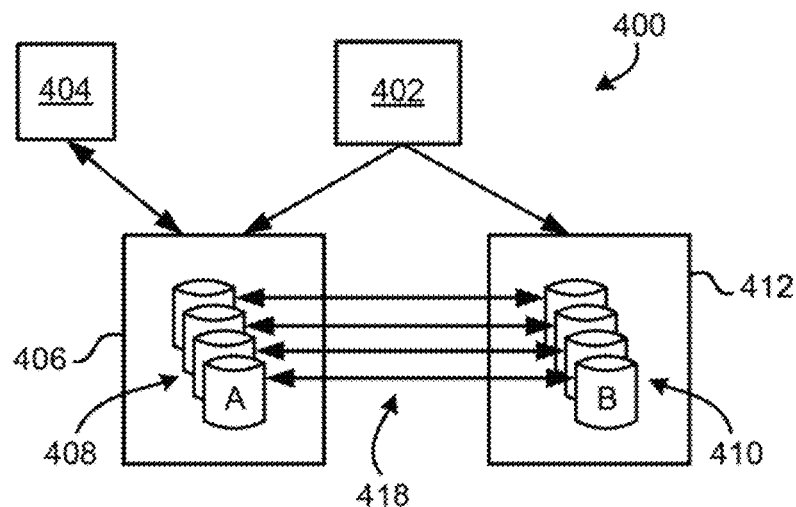
FIGS. 4A-4D show a system utilizing a data redundancy configuration throughout a migration, according to one embodiment.
Figure 4B:
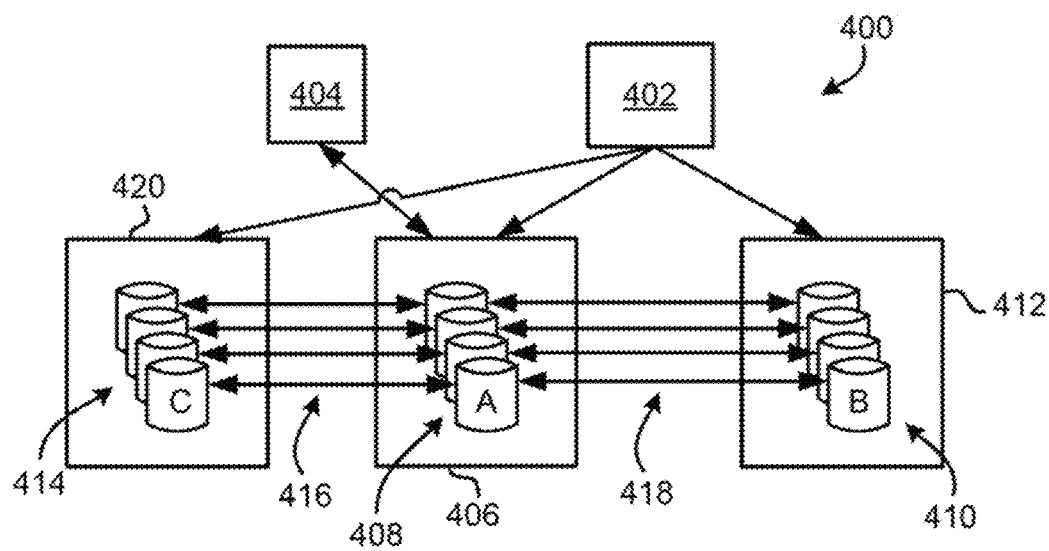

According to various embodiments, as shown in FIGS. 4A-4B, a command may be issued to the copy services management software 402 to replace an original target storage subsystem 412 which is in a copy services relationship 418 with a source storage subsystem 406 which forms a disaster recovery configuration. This command may be issued by a user using a terminal capable of sending commands to the copy services management software 402, in one approach. The user may be asked to specify the new target storage subsystem 420 with which to replace the original target storage subsystem 412 in the disaster recovery configuration, in one approach. It is assumed that the new target storage subsystem 420 is already defined as being managed by the copy services management software 402. If not, the copy services management software 402 may be altered such that it can control the new target storage subsystem 420, or a different target storage subsystem may be selected.

This request may be issued in a graphical user interface (GUI), in a command line interface (CLI), or using any other method of allowing the user to instruct the copy services management software 402, as would be understood by one of skill in the art upon reading the present descriptions.

According to one embodiment, the command may not be issued, possibly because it may not be an option for the user to select, unless all pairs of volumes in copy service relationships 418 are full duplex and a transfer session is in a prepared state. By "full duplex" what is meant is that all pairs are consistent on the primary and secondary site, otherwise referred to as fully consistent. Only at this point may the command become available to the user on the GUI, CLI, or other interface.

In another approach, the copy services management software 402 may determine which storage subsystem to switch to based on some factors or conditions, which may be specified by the user after the user has issued the command to switch to a new target. Once the new target storage subsystem 420 is selected, the user (or the copy services management software 402) may specify/select (such as from a list of available copy relationships) one or more copy relationships 418 to migrate to the new target storage subsystem 420, which are represented as copy relationships 416.

If the copy services management software 402 makes this selection, it may utilize a volume matching algorithm to create pairings based on at least volume size and volume type such that appropriate volumes are selected for the copy services relationships in each pairing. These potential pairings may then be displayed to the user to accept or manually change the pairing selections, or they may be selected automatically by the copy services management software 402. The copy services management software 402 uses multi-target functionality to establish copy services relationships 416 between the source volumes 408 and the new target volumes 414, leaving the original relationships intact 418.

To reiterate, when the user has completed these selections (or the copy services management software 402 has made these determinations automatically), as shown in FIG. 4B, the copy services management software 402 may automatically select the appropriate target volumes C 414 on the new target storage subsystem 420 according to size and compatibility, or the copy services management software 402 may create new target volumes on the new target storage subsystem 420 which have the characteristics appropriate for copying data from the original source volumes 408 on the source storage subsystem 406, according to various embodiments.

Then, the copy services management software 402 establishes copy services relationships 416 between the original source volumes A 408 and the new target volumes C 414, in one approach, while maintaining the copy services relationships 418 between the original source volumes A 408 on the source storage subsystem 406 and those original target volumes B 410 on the original target storage subsystem 412.

Figure 4C:
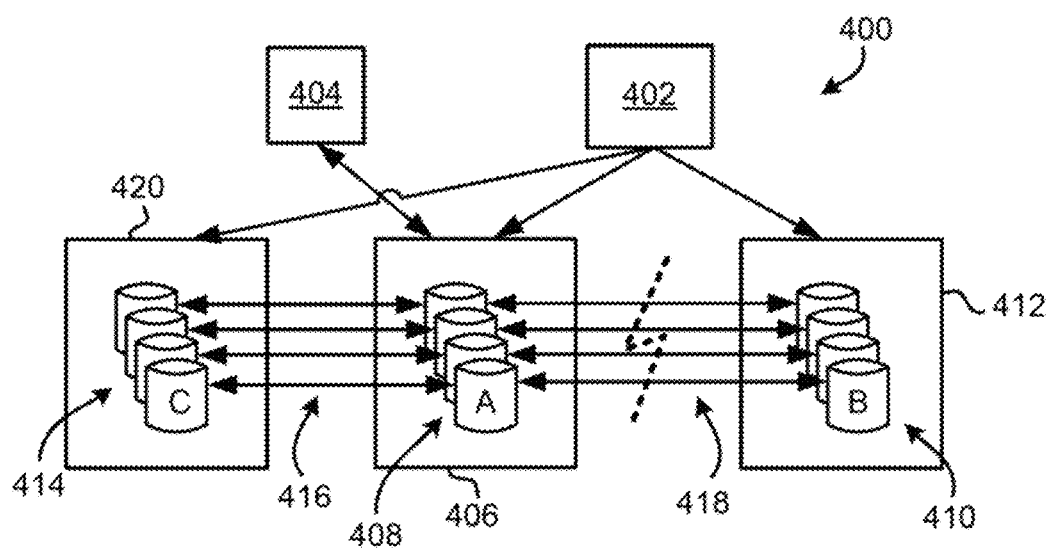
Figure 4D:
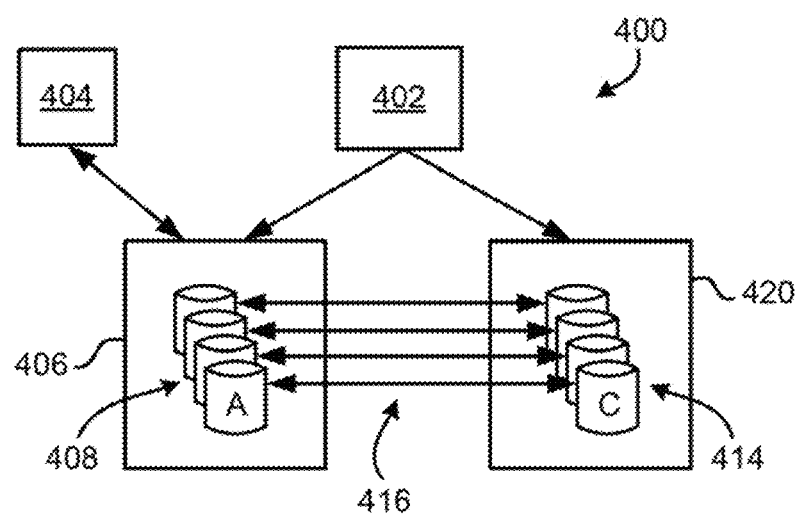

As shown in FIG. 4C, when the new relationships 416 have all reached full duplex, the copy services management software 402 may terminate all of the copy services relationships 418 between the source volumes A 408 on the source storage subsystem 406 and those original target volumes B 410 on the original target storage subsystem 412. Furthermore, the copy services management software 402 may continue managing the relationships 416 created with the new target storage subsystem 420, and pathing may be cleaned up to ensure that there are no conflicting paths remaining and that a best path is used for each relationship. This may be accomplished, in one embodiment, by removing all paths between the source storage subsystem 406 and the original target storage subsystem 412.

This enables a new and valuable feature for the copy services management software 402. This feature is not available currently in any known products, and it allows for faster and more reliable switching to a new target storage subsystem than a manual operation because there is no need to for the user to quiesce I/O or to manually create/delete multiple copy services relationships—one by one—as is conventionally done. The automation of this process speeds up the time to completion and allows the system to return to disaster recovery capable mode in a timely manner while eliminating any risk of user error that may occur in the conventional manual process.

Figure 5:
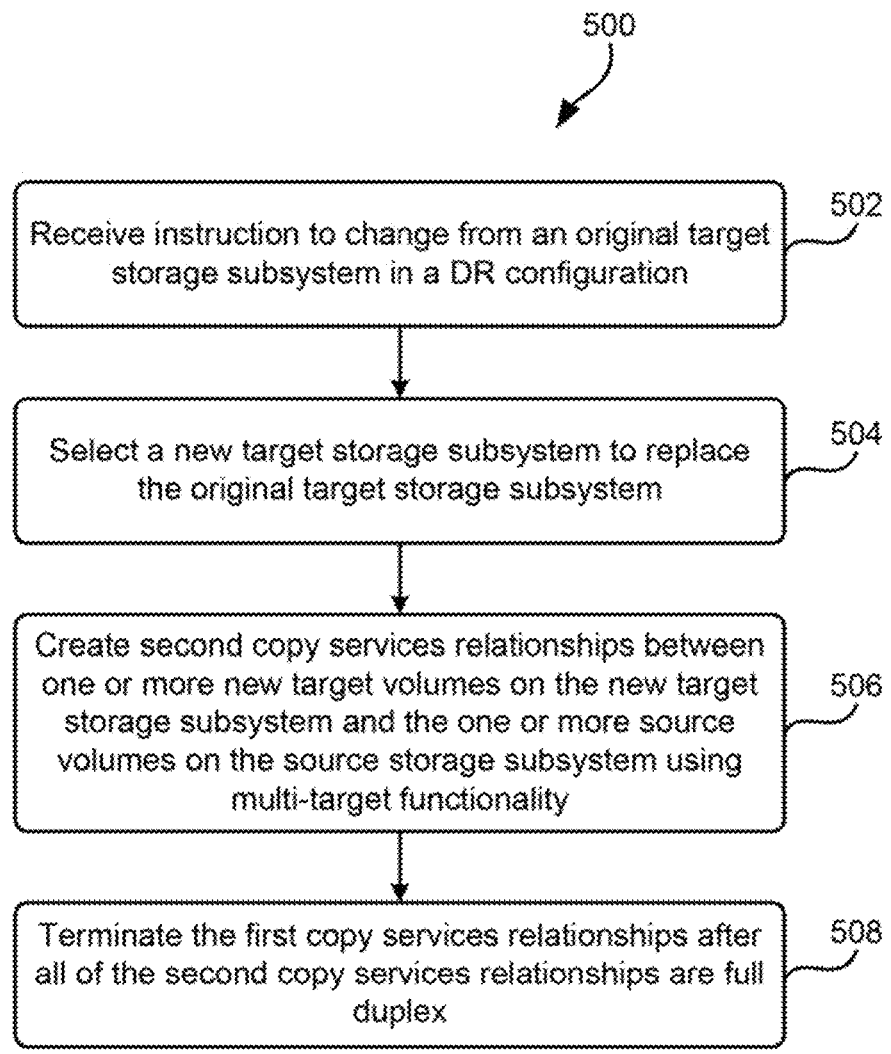
FIG. 5 is a flowchart of a method, according to one embodiment.

In accordance with one embodiment, as shown in FIG. 5, a method 500 for switching a target storage subsystem in a disaster recovery configuration is shown. The method 500 may be carried out in any desired environment, and may include embodiments and/or approaches described in relation to FIGS. 1-4D, among others. Of course, more or less operations than those shown in FIG. 5 may be performed in method 500 as would be known to one of skill in the art.

In operation 502, instruction to change a target storage subsystem in a disaster recovery configuration is received, e.g., from a user, from another application, from other computer instructions within the same program, etc. In one approach, the disaster recovery configuration may comprise one or more source volumes on a source storage subsystem from which data is copied in first copy services relationships with one or more original target volumes on an original target storage subsystem to which data is copied in the first copy services relationships. The one or more source volumes are also accessible to at least one application for use in functions of the application, such as data writing and/or reading.

In operation 504, a new target storage subsystem is selected to replace the original target storage subsystem. In one embodiment, this selection may be made by a user. The user may be presented with a list of possible storage subsystem which are managed by a common entity, or the user may enter in a specific storage subsystem which the user knows will function and be compatible.

In one embodiment, prior to selecting the new target storage subsystem to replace the original target storage subsystem, indication of one or more of the first copy services relationships to migrate to the new target storage subsystem may be received, such as from a user or some other entity requesting the migration. These specific copy services relationships may be used to determine which target storage subsystem will be used in the new copy services relationships, in some approaches.

In another embodiment, one or more possible volume pairings between the one or more source volumes and the one or more new target volumes on the new target storage subsystem may be determined, such as by using a volume matching algorithm to create pairings based on at least volume size and volume type. Other factors may also be considered, as known in the art to be useful in choosing pairings.

In operation 506, second copy services relationships are created between one or more new target volumes on the new target storage subsystem and the one or more source volumes on the source storage subsystem using multi-target functionality.

According to another embodiment, prior to creating the second copy services relationships, a message may be issued, displayed, presented, generated for, or otherwise provided to a user. The message may comprise the one or more possible volume pairings between the one or more source volumes and the one or more new target volumes. In addition, in one approach, selection of volume pairings for each of the second copy services relationships may be received from the user in response to the message.

In an alternate approach, prior to creating the second copy services relationships, volume pairings for each of the second copy services relationships may be selected from the one or more possible volume pairings based on compatibility between source and target volumes. This may be performed automatically with no input from the user.

In addition, these second copy services relationships may be created automatically, or may created only as specified by the user.

In operation 508, the first copy services relationships are terminated after all of the second copy services relationships are full duplex.

In a further embodiment, after terminating the first copy services relationships, all paths between the source storage subsystem and the original target storage subsystem may be removed, e.g., the pathing may be cleaned up. This helps to ensure that the system will function optimally and no residual effects will be left behind after the migration.

In another embodiment, prior to receiving the instruction to change the target storage subsystem in the disaster recovery configuration, the one or more original target volumes and the corresponding one or more source volumes may be determined to be full duplex. Also, an option may be presented to the user to change the target storage subsystem in the disaster recovery configuration. In this way, the user may be restricted from targeting a new storage subsystem until the current disaster recovery configuration is full duplex.

Generally, it may be a condition that the one or more original target volumes and the one or more new target volumes are located on different storage subsystems, but this is not necessarily required. In fact, in one embodiment, the one or more new target volumes may be located on the same storage subsystem as the one or more original target volumes.

In other embodiments, the one or more original target volumes may be distributed across two or more storage subsystems in order to spread out resources and aid in workload balancing, or in an alternate embodiment, the one or more original target volumes may be consolidated onto a single storage subsystem in order to minimize management of resources.

In some more embodiments, all or any portion of method 500 may be implemented in a system and/or a computer program product.

In one such embodiment, a system includes one or more source volumes on a source storage subsystem from which data is copied in first copy services relationships, the one or more source volumes being accessible to an application, one or more original target volumes on an original target storage subsystem to which data is copied in the first copy services relationships. The system may also include logic adapted for selecting a new target storage subsystem to replace the original target storage subsystem, logic adapted for creating second copy services relationships between one or more new target volumes on the new target storage subsystem and the one or more source volumes on the source storage subsystem using multi-target functionality, and logic adapted for terminating the first copy services relationships after all of the second copy services relationships are full duplex.

In another such embodiment, a computer program product for switching a storage subsystem in a disaster recovery configuration comprises a computer readable storage medium having computer readable program code embodied therewith. The computer readable program code comprises: computer readable program code configured for receiving instruction to change from an original target storage subsystem in a disaster recovery configuration, the disaster recovery configuration comprising a source storage subsystem comprising one or more source volumes from which data is copied in first copy services relationships, the one or more source volumes being accessible to an application and the original target storage subsystem comprising one or more original target volumes to which data is copied in the first copy services relationships. The computer readable program code further comprises computer readable program code configured for selecting a new target storage subsystem to replace the original target storage subsystem, computer readable program code configured for creating second copy services relationships between one or more new target volumes on the new target storage subsystem and the one or more source volumes on the source storage subsystem using multi-target functionality, and computer readable program code configured for terminating the first copy services relationships after all of the second copy services relationships are full duplex.

Of course, any of the embodiments and/or approaches described herein may be implemented in either the system or computer program product, as described above, according to a plurality of additional embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for switching a storage subsystem in a disaster recovery configuration, the method comprising:
    receiving instruction to change from an original target storage subsystem in a disaster recovery configuration, the disaster recovery configuration comprising:
        a source storage subsystem comprising one or more source volumes from which data is copied in first copy services relationships, the one or more source volumes being accessible to an application; and
        the original target storage subsystem comprising one or more original target volumes to which data is copied in the first copy services relationships;
    selecting a new target storage subsystem to replace the original target storage subsystem;
    creating second copy services relationships between one or more new target volumes on the new target storage subsystem and the one or more source volumes on the source storage subsystem using multi-target functionality; and
    terminating the first copy services relationships after all of the second copy services relationships are full duplex.

2. The method as recited in claim 1, further comprising, prior to selecting the new target storage subsystem to replace the original target storage subsystem:
    receiving indication of one or more of the first copy services relationships to migrate to the new target storage subsystem.

3. The method as recited in claim 1, further comprising determining one or more possible volume pairings between the one or more source volumes and the one or more new target volumes on the new target storage subsystem using a volume matching algorithm to create pairings based on at least volume size and volume type.

4. The method as recited in claim 3, further comprising, prior to creating the second copy services relationships:
    issuing a message to a user, the message comprising the one or more possible volume pairings between the one or more source volumes and the one or more new target volumes, and
    receiving selection of volume pairings for each of the second copy services relationships from the user, wherein the selection is received in response to the message.

5. The method as recited in claim 3, further comprising, prior to creating the second copy services relationships, selecting volume pairings for each of the second copy services relationships from the one or more possible volume pairings based on compatibility between source and target volumes.

6. The method as recited in claim 1, further comprising, after terminating the first copy services relationships, removing all paths between the source storage subsystem and the original target storage subsystem.

7. The method as recited in claim 1, further comprising, prior to receiving the instruction to change the target storage subsystem in the disaster recovery configuration:
    determining that the one or more original target volumes and the corresponding one or more source volumes are full duplex; and
    presenting an option to a user to change the target storage subsystem in the disaster recovery configuration.

8. The method as recited in claim 1, wherein at least one of: the one or more original target volumes and the one or more new target volumes are located on different storage subsystems, the one or more original target volumes are distributed across two or more storage subsystems in order to spread out resources and aid in workload balancing, and the one or more original target volumes are consolidated onto a single storage subsystem in order to minimize management of resources.

* * * * *